US012659668B2

(12) United States Patent
Zhang

(10) Patent No.: US 12,659,668 B2
(45) Date of Patent: Jun. 16, 2026

(54) SPEAKER DIAPHRAGM AND SPEAKER WITH IMPROVED ACOUSTIC PERFORMANCE

(71) Applicant: MERRY ELECTRONICS (SUZHOU) CO., LTD., Suzhou (CN)

(72) Inventor: Qingquan Zhang, Suzhou (CN)

(73) Assignee: MERRY ELECTRONICS (SUZHOU) CO., LTD., Jiangsu Province (CN)

( * ) Notice: Subject to any disclaimer, the term of this patent is extended or adjusted under 35 U.S.C. 154(b) by 320 days.

(21) Appl. No.: 18/367,162

(22) Filed: Sep. 12, 2023

(65) Prior Publication Data

US 2024/0373167 A1 Nov. 7, 2024

(30) Foreign Application Priority Data

May 4, 2023 (CN) ......................... 202310488098.9

(51) Int. Cl.
*H04R 7/10* (2006.01)
*H04R 7/18* (2006.01)

(52) U.S. Cl.
CPC ................. *H04R 7/10* (2013.01); *H04R 7/18* (2013.01); *H04R 2307/025* (2013.01)

(58) Field of Classification Search
CPC ....... H04R 7/10; H04R 7/18; H04R 2307/025
See application file for complete search history.

(56) References Cited

U.S. PATENT DOCUMENTS

2005/0244029 A1* 11/2005 Takayama ................ H04R 7/18 381/404
2019/0149924 A1* 5/2019 Cheng .................... H04R 9/025 381/412

FOREIGN PATENT DOCUMENTS

| | | | |
|---|---|---|---|
| CN | 203574852 | U | 4/2014 |
| CN | 106162454 | A | 11/2016 |
| CN | 208638607 | U | 3/2019 |
| CN | 210899583 | U | 6/2020 |
| CN | 211531286 | U | 9/2020 |
| CN | 215682560 | U | 1/2022 |
| CN | 217388986 | U | 9/2022 |
| CN | 217389008 | U | 9/2022 |

* cited by examiner

*Primary Examiner* — Sunita Joshi
(74) *Attorney, Agent, or Firm* — Birch, Stewart, Kolasch & Birch, LLP

(57) ABSTRACT

A speaker diaphragm includes a diaphragm main body and a composite layer. The diaphragm main body includes a fixing portion, an annular portion and a central portion. The annular portion is connected to the fixing portion. The central portion is connected to the annular portion. The composite layer includes a composite fixing portion and a composite bent portion connected to the composite fixing portion. The composite fixing portion is bonded and fixed to the fixing portion. The composite bent portion is bonded and fixed to at least part of the annular portion. The speaker diaphragm of the present disclosure is beneficial to reduce the rocking vibration. A speaker having the speaker diaphragm is also disclosed.

15 Claims, 10 Drawing Sheets

SPEAKER DIAPHRAGM AND SPEAKER WITH IMPROVED ACOUSTIC PERFORMANCE

CROSS-REFERENCE TO RELATED APPLICATION

This patent application claims priority of a Chinese Patent Application No. 202310488098.9, filed on May 4, 2023 and titled "SPEAKER DIAPHRAGM AND SPEAKER", the entire content of which is incorporated herein by reference.

TECHNICAL FIELD

The present disclosure relates to a speaker diaphragm and a speaker, which belongs to a technical field of electroacoustic conversion.

BACKGROUND

In the related art, a diaphragm of a micro-speaker adopts a composite structure of a high modulus plastic film layer (PEEK, PAR, PEI, PI, etc.), a soft thermoplastic polyurethane (TPU) and a damping film (acrylic glue, silica gel, etc.). A large-amplitude micro-speaker is usually provided with a damper. The damper can prevent a voice coil from swinging in the process of movement and prevent it from touching a pole piece or magnet, so that it can make a better simple harmonic motion along the designed axial direction to push the diaphragm to produce sound. The increase of the damper will take up space, affect the size of the magnet, reduce the power conversion factor, reduce the sensitivity, and thus affect the overall acoustic performance. If the damper is not installed, and the conventional speaker diaphragm is adopted, the rocking vibration of the speaker diaphragm will be large, and the sound quality and listening stability will be poor.

SUMMARY

An object of the present disclosure is to provide a speaker diaphragm and a speaker with small rocking vibration and improved acoustic performance.

In order to achieve the above object, the present disclosure adopts the following technical solution: a speaker diaphragm, including: a diaphragm main body including a fixing portion, an annular portion and a central portion, the annular portion being connected to the fixing portion: the central portion being connected to the annular portion; and a composite layer including a composite fixing portion and a composite bent portion connected to the composite fixing portion; the composite fixing portion is bonded and fixed to the fixing portion; the composite bent portion is bonded and fixed to at least part of the annular portion.

In order to achieve the above object, the present disclosure adopts the following technical solution: a speaker, including a speaker diaphragm: the speaker diaphragm including: a diaphragm main body including a fixing portion, an annular portion and a central portion: the annular portion being connected to the fixing portion; the central portion being connected to the annular portion; and a composite layer including a composite fixing portion and a composite bent portion connected to the composite fixing portion; the composite fixing portion is bonded and fixed to the fixing portion: the composite bent portion is bonded and fixed to at least part of the annular portion.

In order to achieve the above object, the present disclosure adopts the following technical solution: a speaker, including a speaker diaphragm; the speaker diaphragm including: a diaphragm main body including a fixing portion, an annular portion and a central portion; the annular portion being connected to the fixing portion; the central portion being connected to the annular portion: a composite layer including a composite fixing portion and a composite bent portion connected to the composite fixing portion; and an adhesive layer, the composite fixing portion being fixed to the fixing portion through the adhesive layer, the composite bent portion being fixed to at least part of the annular portion through the adhesive layer, wherein the speaker does not have a damper.

Compared with the prior art, the present disclosure increases the rigidity of a corresponding position by compounding a layer of the composite layer at a local position of the diaphragm main body, which is beneficial to reduce the vibration of the voice coil during movement. On the basis of canceling the damper design, it does not affect the overall performance of the product. After the damper design is cancelled, a space originally occupied by the damper can be used to increase the length of the magnet, thereby increasing the power conversion factor and improving the acoustic performance. At the same time, the manufacturing process can be simplified, the manufacturing yield can be improved, and the cost can be saved.

DETAILED DESCRIPTION

Figure 1:
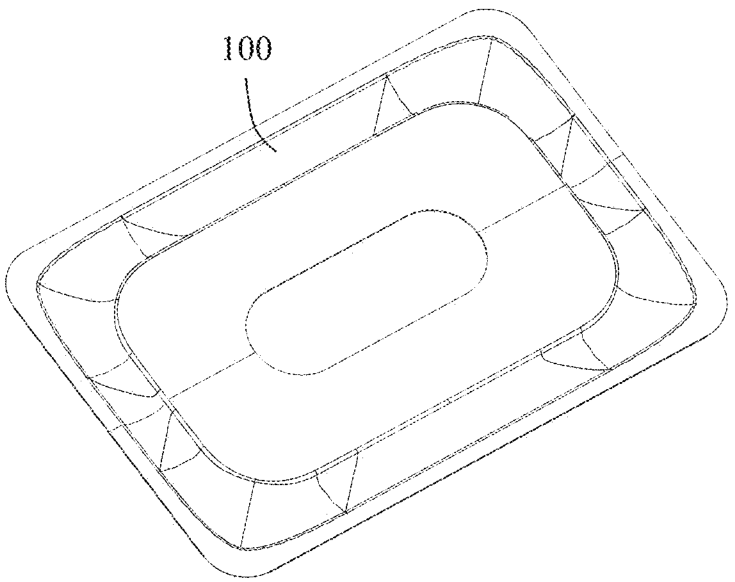
FIG. 1 is a schematic perspective view of a speaker diaphragm in accordance with a first embodiment of the present disclosure.
Figure 2:
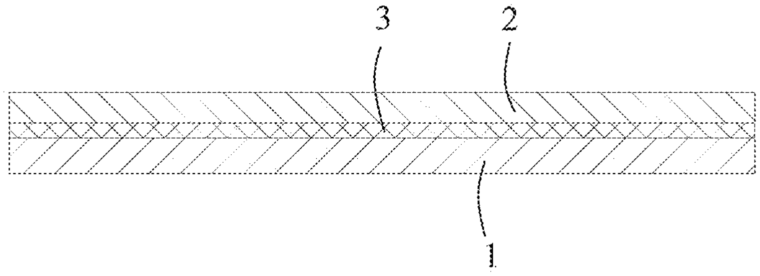
FIG. 2 is a partial cross-sectional schematic view of the speaker diaphragm in accordance with the first embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

FIG. 1 to FIG. 8 show a speaker diaphragm 100 in accordance with a first embodiment of the present disclosure. The speaker diaphragm 100 includes a diaphragm main body 1, a composite layer 2, and an adhesive layer 3 for bonding the diaphragm main body 1 and the composite layer 2.

Figure 3:
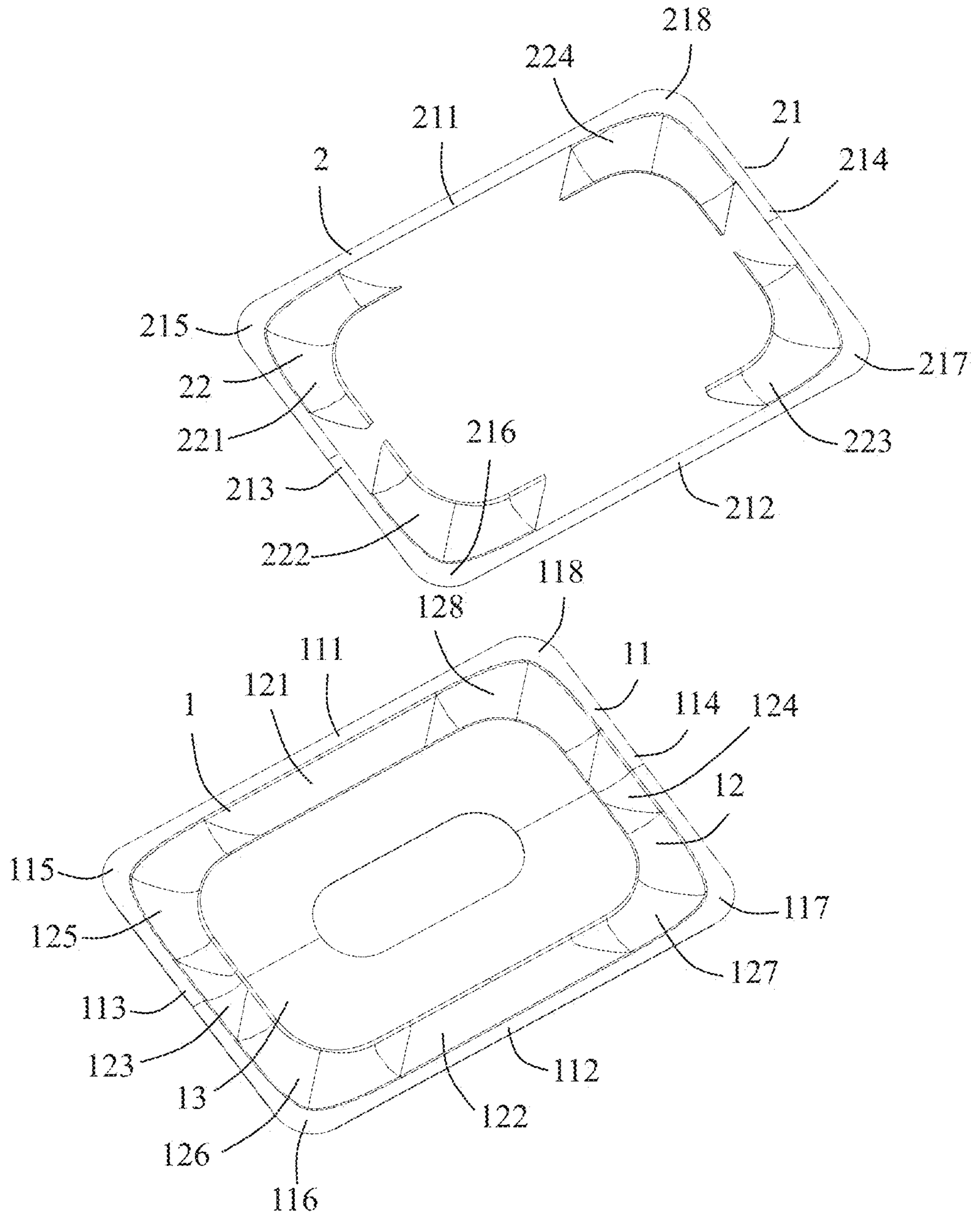
FIG. 3 is a perspective exploded view of a diaphragm main body and a composite layer in FIG. 1.
Figure 4:
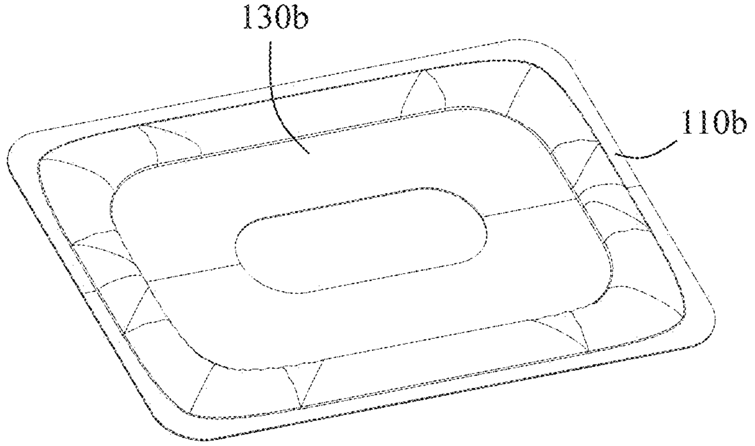
FIG. 4 is a schematic perspective view of FIG. 1 from another angle.
Figure 5:
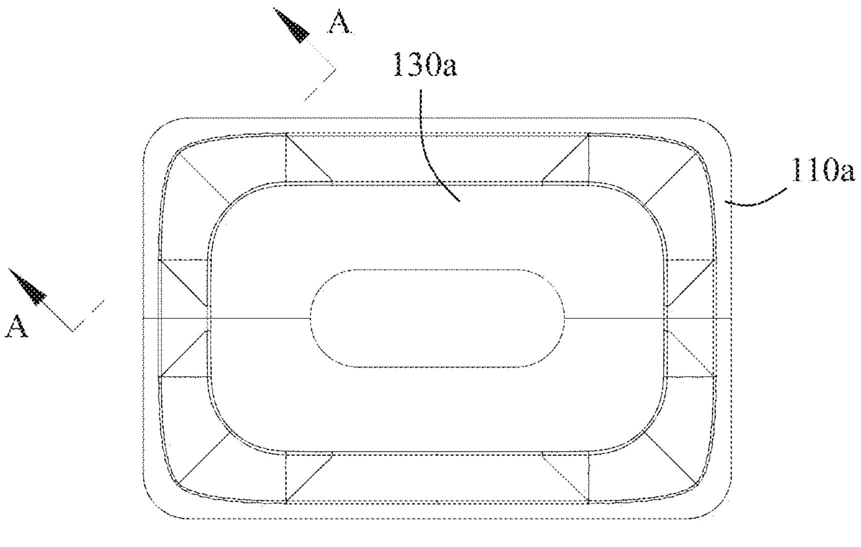
FIG. 5 is a front view of FIG. 1.

The diaphragm main body 1 is roughly rectangular. Referring to FIG. 3, the diaphragm main body 1 includes a fixing portion 11, an annular portion 12 and a central portion 13. The annular portion 12 is connected to the fixing portion 11. The central portion 13 is connected to the annular portion 12. The fixing portion 11 is disposed around an outer edge of the annular portion 12. The annular portion 12 is disposed around an outer edge of the central portion 13. Specifically, referring to FIG. 4 and FIG. 5, the fixing portion 11 includes a first surface **110*a* and a second surface 110*b* which are located on opposite sides in a thickness direction of the fixing portion 11. The central portion 13 includes a third surface 130*a* and a fourth surface 130*b* which are located on opposite sides in a thickness direction of the central portion 13. The first surface 110*a* and the third surface 130*a* are located in a same plane. The second surface 110*b* and the fourth surface 130*b* are located in a same plane. The annular portion 12 protrudes beyond the second surface 110*b* and the fourth surface 130*b***.

The fixing portion 11 is annular-shaped. Specifically, referring to FIG. 3, the fixing portion 11 includes a first side portion 111, a second side portion 112 opposite to the first side portion 111, a third side portion 113, a fourth side portion 114 opposite to the third side portion 113, a first corner portion 115 connecting the first side portion 111 and the third side portion 113, a second corner portion 116 connecting the third side portion 113 and the second side portion 112, a third corner portion 117 connecting the second side portion 112 and the fourth side portion 114, and a fourth corner portion 118 connecting the fourth side portion 114 and the first side portion 111. The first corner portion 115, the second corner portion 116, the third corner portion 117 and the fourth corner portion 118 are located at four corners of the fixing portion 11, respectively. The first corner portion 115, the second corner portion 116, the third corner portion 117 and the fourth corner portion 118 are all bent structures.

In the illustrated embodiment of the present disclosure, a length of the first side portion 111 is equal to a length of the second side portion 112. A length of the third side portion 113 is equal to a length of the fourth side portion 114. Each of the lengths of the first side portion 111 and the second side portion 112 is greater than each of the lengths of the third side portion 113 and the fourth side portion 114.

Figure 6:
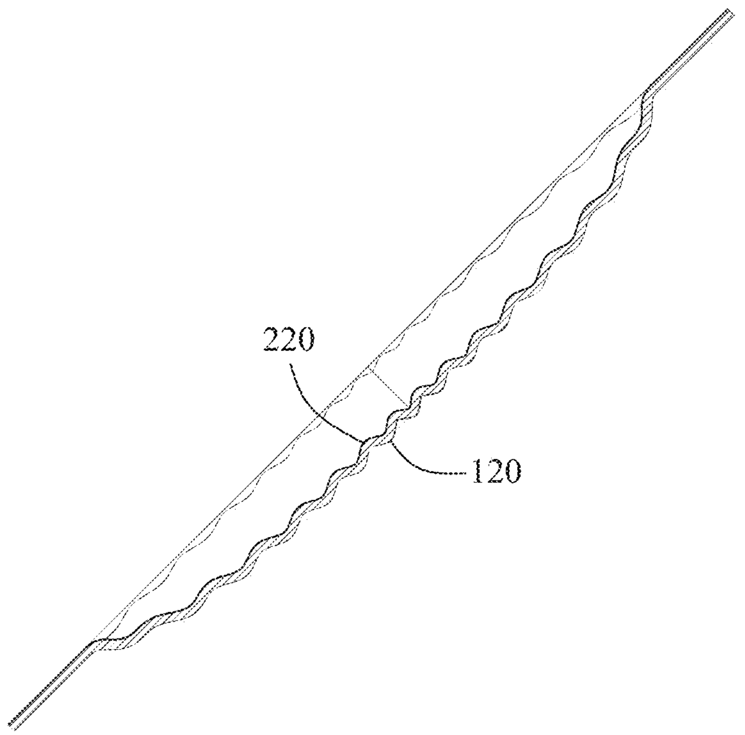
FIG. 6 is a schematic sectional view taken along line A-A in FIG. 5.

Referring to FIG. 3, the annular portion 12 includes a fifth side portion 121 connected to the first side portion 111, a sixth side portion 122 connected to the second side portion 112, a seventh side portion 123 connected to the third side portion 113, an eighth side portion 124 connected to the fourth side portion 114, a first bent portion 125 connected to the first corner portion 115, a second bent portion 126 connected to the second corner portion 116, a third bent portion 127 connected to the third corner portion 117, and a fourth bent portion 128 connected to the fourth corner portion 118. The first bent portion 125 connects the fifth side portion 121 and the seventh side portion 123. The second bent portion 126 connects the seventh side portion 123 and the sixth side portion 122. The third bent portion 127 connects the sixth side portion 122 and the eighth side portion 124. The fourth bent portion 128 connects the eighth side portion 124 and the fifth side portion 121. Referring to FIG. 6, each of the first bent portion 125, the second bent portion 126, the third bent portion 127 and the fourth bent portion 128 includes a first corrugation 120. The first corrugations 120 can effectively enhance the stability of the diaphragm, reduce polarization, and improve the acoustic performance of the diaphragm.

Figure 7:
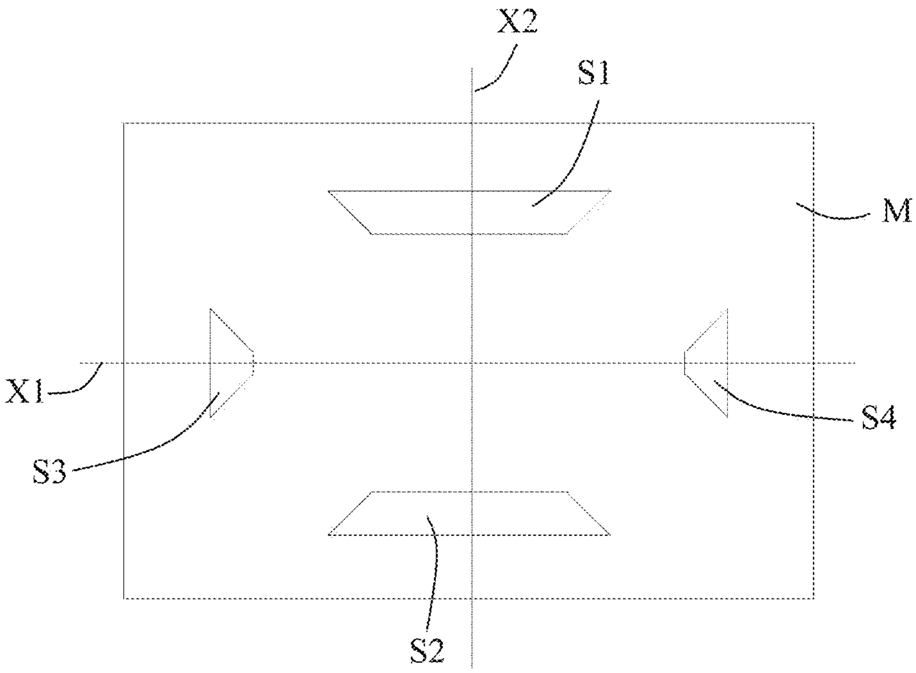
FIG. 7 is a schematic view of a relationship between a first straight line, a second straight line and a plane in accordance with an embodiment of the present disclosure.

In the present disclosure, referring to FIG. 7, a plane M parallel to the first surface **110*a* is defined. On the plane M, a first straight line X1 and a second straight line X2 are defined; and the first straight line X1 is perpendicular to the second straight line X2. The fifth side portion 121 has a first projection S1 on the plane M: the sixth side portion 122 has a second projection S2 on the plane M; and the first projection S1 is symmetrical to the second projection S2 with respect to the first straight line X1. The seventh side portion 123 has a third projection S3 on the plane M: the eighth side portion 124** has a fourth projection S4 on the plane M; and the third projection S3 is symmetrical to the fourth projection S4 with respect to the second straight line X2.

In the embodiment shown in the present disclosure, the shapes of the first projection S1, the second projection S2, the third projection S3 and the fourth projection S4 are all trapezoidal And, an area of each of the first projection S1 and the second projection S2 is larger than an area of the third projection S3 and the fourth projection S4.

Figure 8:
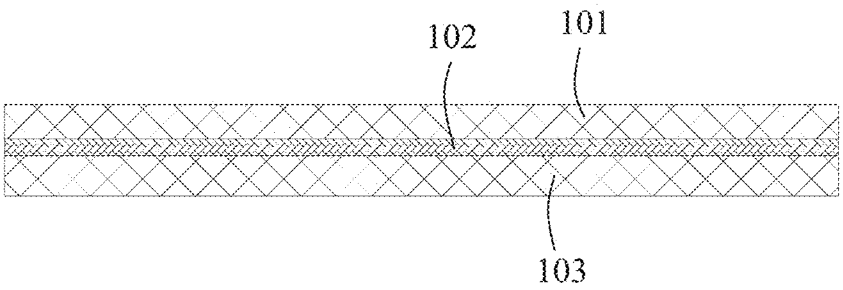
FIG. 8 is a schematic partial cross-sectional view of the diaphragm main body in the present disclosure.

Referring to FIG. 8, the diaphragm main body 1 includes a first outer layer 101, a middle layer 102 and a second outer layer 103. The first outer layer 101, the middle layer 102 and the second outer layer 103 are integrated into a whole. The first outer layer 101 and the second outer layer 103 are made of thermoplastic materials. The middle layer 102 uses damping glue through which the first outer layer 101 and the second outer layer 103 are bonded and fixed. The first outer layer 101 is bonded and fixed to the composite layer 2 through the adhesive layer 3.

In the illustrated embodiment of the present disclosure, both the first outer layer 101 and the second outer layer 103 are made of PEEK, i.e., Polyether Ether Ketone. The PEEK material is resistant to organic and aqueous environments. This material has excellent chemical resistance, thermal stability and oxidation resistance, while having good mechanical strength, creep resistance and electrical properties. It can withstand high-energy radiation and has good flame retardant. The composite layer 2 is made of the same material as the first outer layer 101.

Referring to FIG. 3, the composite layer 2 includes a composite fixing portion 21 and a composite bent portion 22 connected to the composite fixing portion 21. The composite fixing portion 21 is bonded and fixed to the fixing portion 11 through the adhesive layer 3. The composite fixing portion 21 is also annular, and the size of the composite fixing portion 21 is the same as that of the fixing portion 11.

Continuing to refer to FIG. 3, the composite fixing portion 21 includes a first composite side portion 211, a second composite side portion 212 opposite to the first composite side portion 211, a third composite side portion 213, a fourth composite side portion 214 opposite to the third composite side portion 213, a first composite corner portion 215 connecting the first composite side portion 211 and the third composite side portion 213, a second composite corner portion 216 connecting the third composite side portion 213 and the second composite side portion 212, a third composite corner portion 217 connecting the second composite side portion 212 and the fourth composite side portion 214, and a fourth composite corner portion 218 connecting the fourth composite side portion 214 and the first composite side portion 211. In the illustrated embodiment of the present disclosure, the first composite side portion 211 and the first side portion 111 are bonded and fixed through the adhesive layer 3. The second composite side portion 212 is bonded and fixed to the second side portion 112 through the adhesive layer 3. The third composite side portion 213 is bonded and fixed to the third side portion 113 through the adhesive layer 3. The fourth composite side portion 214 is bonded and fixed to the fourth side portion 114 through the adhesive layer 3. The first composite corner portion 215 is bonded and fixed to the first corner portion 115 through the adhesive layer 3. The second composite corner portion 216 is bonded and fixed to the second corner portion 116 through the adhesive layer 3. The third composite corner portion 217 is bonded and fixed to the third corner portion 117 through the adhesive layer 3. The fourth composite corner portion 218 is bonded and fixed to the fourth corner portion 118 through the adhesive layer 3. With such arrangement, it is beneficial to increase the rigidity of a corresponding position of the diaphragm main body 1, and does not affect the overall performance of the product on the basis of canceling the damper design. After the damper design is cancelled, the space originally occupied by the damper can be used to increase the length of the magnet, thereby increasing the power conversion factor and improving the acoustic performance. At the same time, the manufacturing process can be simplified, the manufacturing yield can be improved, and the cost can be saved.

At least part of the composite bent portion 22 and the annular portion 12 are bonded and fixed through the adhesive layer 3. Referring to FIG. 3, the composite bent portion 22 includes a first composite bent portion 221 connected to the first composite corner portion 215, a second composite bent portion 222 connected to the second composite corner portion 216, a third composite bent portion 223 connected to the third composite corner portion 217, and a fourth composite bent portion 224 connected to the fourth composite corner portion 218. The first composite bent portion 221, the second composite bent portion 222, the third composite bent portion 223 and the fourth composite bent portion 224 are bonded and fixed to the annular portion 12 through the adhesive layer 3. Specifically, the first composite bent portion 221 and the first bent portion 125 are bonded and fixed through the adhesive layer 3. The second composite bent portion 222 is bonded and fixed to the second bent portion 126 through the adhesive layer 3. The third composite bent portion 223 is bonded and fixed to the third bent portion 127 through the adhesive layer 3. The fourth composite bent portion 224 is bonded and fixed to the fourth bent portion 128 through the adhesive layer 3.

Referring to FIG. 6, each of the first composite bent portion 221, the second composite bent portion 222, the third composite bent portion 223 and the fourth composite bent portion 224 includes a second corrugation 220. The second corrugation 220 is adapted to a corresponding first corrugation 120.

The adhesive layer 3 is made of a thermoplastic material. A melting point of the thermoplastic material used in the adhesive layer 3 is lower than a melting point of the thermoplastic material used in the composite layer 2 and lower than a melting point of the thermoplastic material used in the first outer layer 101. In the illustrated embodiment of the present disclosure, the adhesive layer 3 is made of PU, i.e., Polyurethane. During the preparation process, the polyurethane material is placed between the diaphragm main body 1 and the composite layer 2, and bonded by hot pressing, and the hot pressing temperature is controlled between 120° and 185°.

In the present embodiment, by compounding the composite layer 2 on the fixing portion 11 of the diaphragm main body 1, the first corner portion 115, the second corner portion 116, the third corner portion 117 and the fourth corner portion 118, the thickness of a corresponding position is increased, the rigidity is increased, and the rocking motion of the speaker is reduced.

Figure 9:
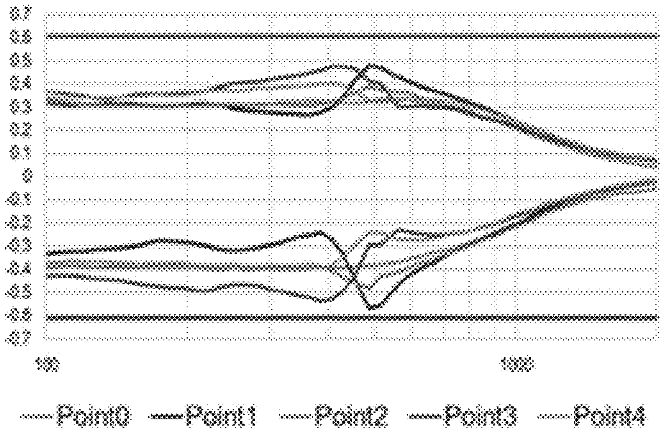
FIG. 9 is a test curve of the vibration displacement of different parts of conventional speaker diaphragm.
Figure 10:
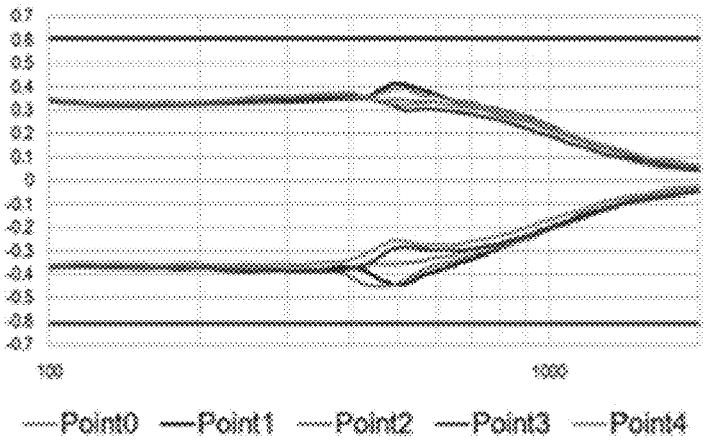
FIG. 10 is a test curve of the vibration displacement of different parts of the speaker diaphragm in accordance with the first embodiment of the present disclosure.

FIG. 9 shows test curves of vibration displacements of different parts of a conventional speaker diaphragm. The conventional diaphragm refers to a diaphragm that does not contain a composite layer (such as the diaphragm main body 1 in the embodiment of the present disclosure). FIG. 10 shows test curves of vibration displacements of different parts of the speaker diaphragm according to the first embodiment of the present disclosure, wherein the abscissa is frequency (Hz), and the ordinate is loudness displacement (mm). When testing the diaphragm of the above two kinds of speakers, the damper setting is cancelled. The tests of the two kinds of speaker diaphragms are carried out at edge positions of the four corners of the central portion 13 and a central position of the central portion 13.

Through the comparison of the test curves, it can be seen that the individual curves in FIG. 9 are relatively scattered, but the individual curves in FIG. 10 are more concentrated. This shows that the vibration amplitude of each part of the speaker diaphragm according to the first embodiment of the present disclosure is highly concentrated, and the overall performance is obviously better than that of the conventional speaker diaphragm. During the vibration process, there is less rocking vibration of the speaker, and the sound quality and listening stability are more excellent.

Figure 11:
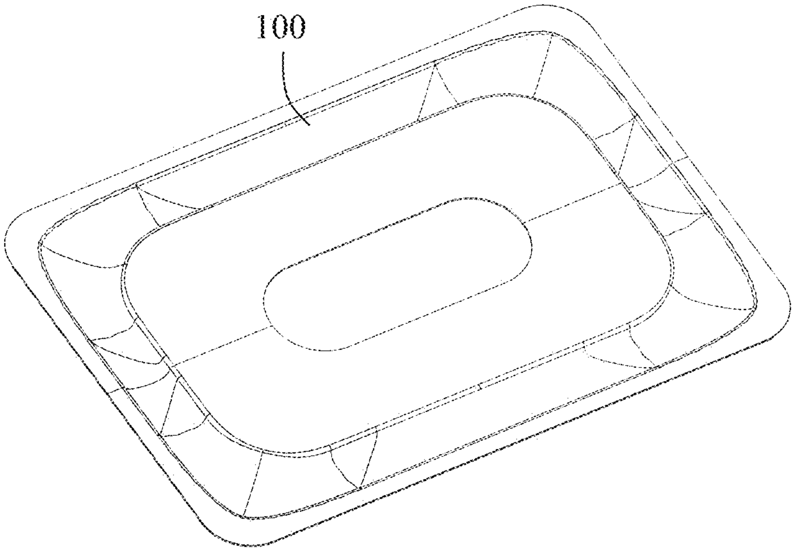
FIG. 11 is a schematic perspective view of the speaker diaphragm in accordance with a second embodiment of the present disclosure.
Figure 12:
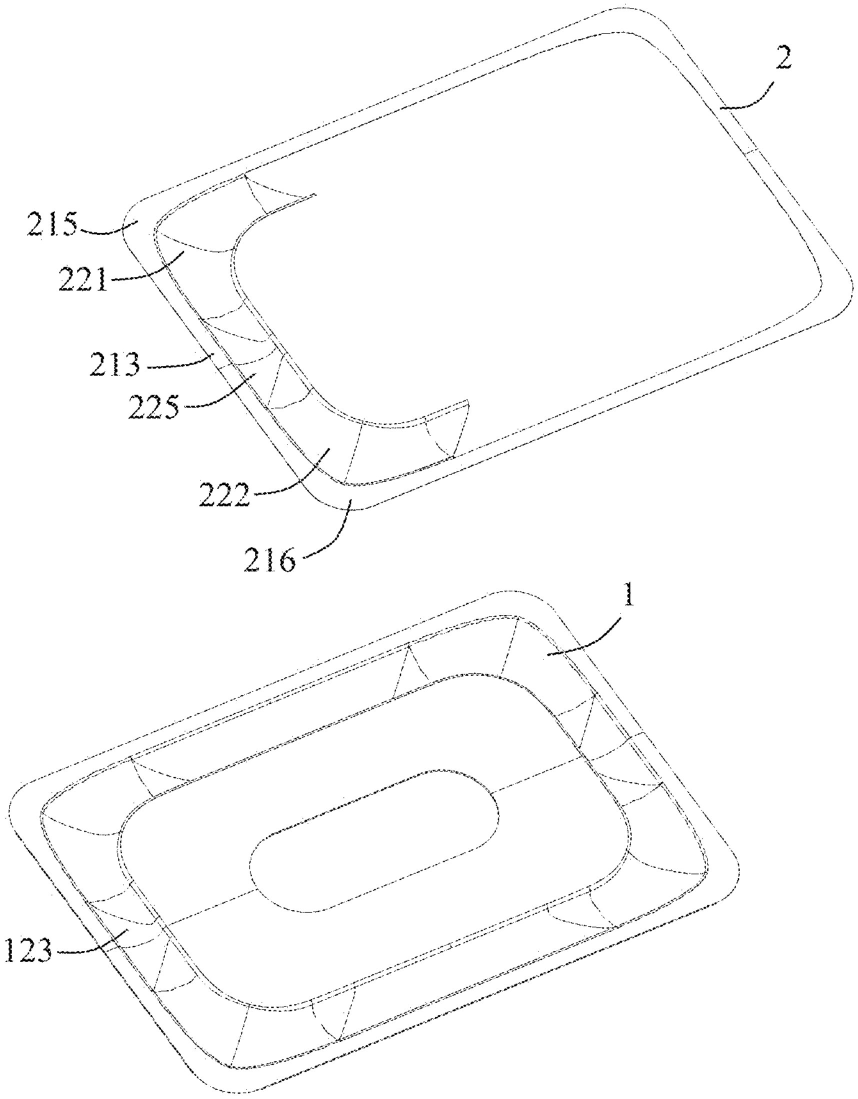
FIG. 12 is a perspective exploded view of the diaphragm main body and the composite layer in FIG. 11.

FIG. 11 and FIG. 12 show a speaker diaphragm 100 according to a second embodiment of the present disclosure. The difference from the first embodiment is that the composite bent portion 22 includes a first composite bent portion 221 connected to the first composite corner portion 215, a second composite bent portion 222 connected to the second composite corner portion 216, a fifth composite bent portion 225 connected to the third composite side portion 213 The fifth composite bent portion 225 connects the first composite bent portion 221 and the second composite bent portion 222. The fifth composite bent portion 225 is bonded and fixed to the annular portion 12 through the adhesive layer 3. Specifically, the fifth composite bent portion 225 is bonded and fixed to the seventh side portion 123 through the adhesive layer 3.

In the present embodiment, by compounding the composite layer 2 on the fixing portion 11 of the diaphragm main body 1, the first corner portion 115 and the seventh side portion 123, the thickness of a corresponding position is increased, the rigidity is increased, and the rocking motion of the speaker is reduced.

Figure 13:
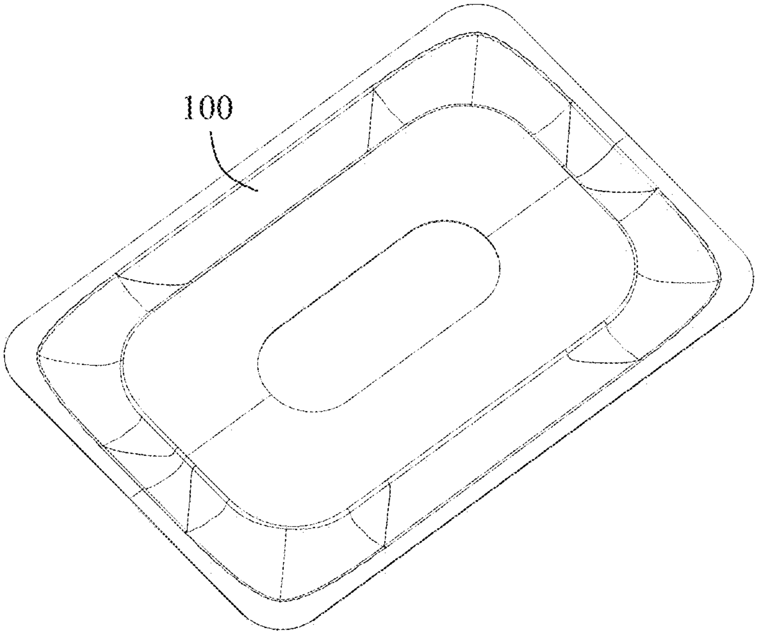
FIG. 13 is a schematic perspective view of the speaker diaphragm in accordance with a third embodiment of the present disclosure.
Figure 14:
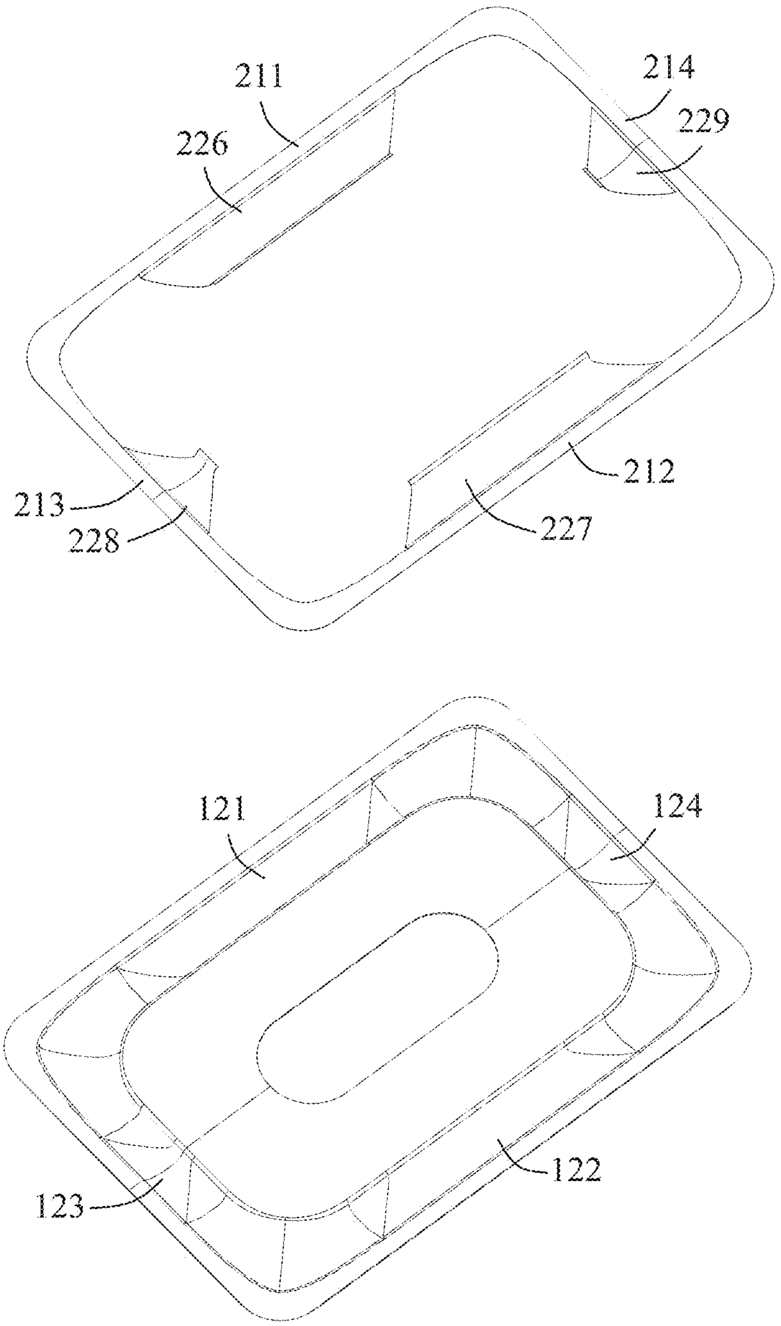
FIG. 14 is an exploded perspective view of the diaphragm main body and the composite layer in FIG. 13.

FIG. 13 and FIG. 14 show a speaker diaphragm 100 according to a third embodiment of the present disclosure. The difference from the first embodiment is that the composite bent portion 22 includes a sixth composite bent portion 226 connected to the first composite side portion 211, a seventh composite bent portion 227 connected to the second composite side portion 212, an eighth composite bent portion 228 connected to the third composite side portion 213, and a ninth composite bent portion 229 connected to the fourth composite side portion 214. The sixth composite bent portion 226, the seventh composite bent portion 227, the eighth composite bent portion 228 and the ninth composite bent portion 229 are bonded and fixed to the annular portion 12 through the adhesive layer 3. In the illustrated embodiment of the present disclosure, the sixth composite bent portion 226 and the fifth side portion 121 are bonded and fixed through the adhesive layer 3. The seventh composite bent portion 227 is bonded and fixed to the sixth side portion 122 through the adhesive layer 3. The eighth composite bent portion 228 is bonded and fixed to the seventh side portion 123 through the adhesive layer 3. The ninth composite bent portion 229 is bonded and fixed to the eighth side portion 124 through the adhesive layer 3.

In the present embodiment, by compounding the composite layer 2 on the fixing portion 11 of the diaphragm main body 1, the fifth side portion 121, the sixth side portion 122, the seventh side portion 123 and the eighth side portion 124, the thickness of a corresponding position is increased, the rigidity is increased, and the rocking motion of the speaker is reduced.

The present disclosure further discloses a speaker having the speaker diaphragm 100. The described speaker eliminates the damper, but its overall performance is not affected.

Compared with the prior art, the present disclosure increases the rigidity of the corresponding position by compounding a layer of the composite layer 2 at a local position of the diaphragm main body 1, which is beneficial to reduce the vibration of the voice coil. On the basis of canceling the damper design, it does not affect the overall performance of the product. After the damper design is cancelled, a space originally occupied by the damper can be used to increase the length of the magnet, thereby increasing the power conversion factor and improving the acoustic performance. At the same time, the manufacturing process can be simplified, the manufacturing yield can be improved, and the cost can be saved.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A speaker diaphragm, comprising:

a diaphragm main body comprising a fixing portion, an annular portion and a central portion; the annular portion being connected to the fixing portion; the central portion being connected to the annular portion; and a composite layer comprising a composite fixing portion and a composite bent portion connected to the composite fixing portion; the composite fixing portion is bonded and fixed to the fixing portion; the composite bent portion is bonded and fixed to at least part of the annular portion;

wherein the speaker diaphragm further comprises an adhesive layer; wherein the composite fixing portion is bonded and fixed to the fixing portion through the adhesive layer; the composite bent portion and the at least part of the annular portion are bonded and fixed through the adhesive layer; and wherein the diaphragm main body comprises a first outer layer; the first outer layer is bonded and fixed to the composite layer through the adhesive layer; the composite layer is made of a same material as the first outer layer.

2. The speaker diaphragm according to claim 1, wherein both the composite layer and the first outer layer are made of thermoplastic materials; the adhesive layer is also made of a thermoplastic material; a melting point of the thermoplastic material used in the adhesive layer is lower than a melting point of the thermoplastic material used in the composite layer and lower than a melting point of the thermoplastic material used in the first outer layer.

3. The speaker diaphragm according to claim 1, wherein the composite fixing portion comprises a first composite side portion, a second composite side portion opposite to the first composite side portion, a third composite side portion, a fourth composite side portion opposite to the third composite side portion, a first composite corner portion connecting the first composite side portion and the third composite side portion, a second composite corner portion connecting the third composite side portion and the second composite side portion, a third composite corner portion connecting the second composite side portion and the fourth composite side portion, and a fourth composite corner portion connecting the fourth composite side portion and the first composite side portion;

the composite bent portion comprises a first composite bent portion connected to the first composite corner portion and a second composite bent portion connected to the second composite corner portion; the first composite bent portion and the second composite bent portion are bonded and fixed to the annular portion through the adhesive layer.

4. The speaker diaphragm according to claim 3, wherein the composite bent portion further comprises a third composite bent portion connected to the third composite corner portion and a fourth composite bent portion connected to the fourth composite corner portion; the third composite bent portion and the fourth composite bent portion are bonded and fixed to the annular portion through the adhesive layer.

5. The speaker diaphragm according to claim 4, wherein the fixing portion comprises a first side portion, a second side portion opposite to the first side portion, a third side portion, a fourth side portion opposite to the third side portion, a first corner portion connecting the first side portion and the third side portion, a second corner portion connecting the third side portion and the second side portion, a third corner portion connecting the second side portion and the fourth side portion, and a fourth corner portion connecting the fourth side portion and the first side portion;

the annular portion comprises a first bent portion connected to the first corner portion, a second bent portion connected to the second corner portion, a third bent portion connected to the third corner portion, and a fourth bent portion connected to the fourth corner portion; the first bent portion is fixed to the first composite bent portion; the second bent portion is fixed to the second composite bent portion; the third bent portion is fixed to the third composite bent portion; the fourth bent portion is fixed to the fourth composite bent portion;

each of the first bent portion, the second bent portion, the third bent portion and the fourth bent portion comprises a first corrugation; each of the first composite bent portion, the second composite bent portion, the third composite bent portion and the fourth composite bent portion comprises a second corrugation; the second corrugation is adapted to a corresponding first corrugation.

6. The speaker diaphragm according to claim 3, wherein the composite bent portion comprises a fifth composite bent portion connected to the third composite side portion; the fifth composite bent portion connects the first composite bent portion and the second composite bent portion; the fifth composite bent portion is bonded and fixed to the annular portion through the adhesive layer.

7. The speaker diaphragm according to claim 1, wherein the composite fixing portion comprises a first composite side portion, a second composite side portion opposite to the first composite side portion, a third composite side portion, a fourth composite side portion opposite to the third composite side portion, a first composite corner portion connecting the first composite side portion and the third composite side portion, a second composite corner portion connecting the third composite side portion and the second composite side portion, a third composite corner portion connecting the second composite side portion and the fourth composite side portion, and a fourth composite corner portion connecting the fourth composite side portion and the first composite side portion;

the composite bent portion comprises a sixth composite bent portion connected to the first composite side portion, a seventh composite bent portion connected to the second composite side portion, an eighth composite bent portion connected to the third composite side portion, and a ninth composite bent portion connected to the fourth composite side portion; the sixth composite bent portion, the seventh composite bent portion, the eighth composite bent portion and the ninth composite bent portion are bonded and fixed to the annular portion through the adhesive layer.

8. A speaker, comprising a speaker diaphragm;

the speaker diaphragm comprising:

a diaphragm main body comprising a fixing portion, an annular portion and a central portion; the annular portion being connected to the fixing portion; the central portion being connected to the annular portion; and a composite layer comprising a composite fixing portion and a composite bent portion connected to the composite fixing portion; the composite fixing portion is bonded and fixed to the fixing portion; the composite bent portion is bonded and fixed to at least part of the annular portion;

wherein speaker diaphragm further comprises an adhesive layer; wherein the composite fixing portion is bonded and fixed to the fixing portion through the adhesive layer; the composite bent portion and the at least part of the annular portion are bonded and fixed through the adhesive layer;

wherein the composite fixing portion comprises a first composite side portion, a second composite side portion opposite to the first composite side portion, a third composite side portion, a fourth composite side portion opposite to the third composite side portion, a first composite corner portion connecting the first composite side portion and the third composite side portion, a second composite corner portion connecting the third composite side portion and the second composite side portion, a third composite corner portion connecting the second composite side portion and the fourth composite side portion, and a fourth composite corner portion connecting the fourth composite side portion and the first composite side portion;

the composite bent portion comprises a first composite bent portion connected to the first composite corner portion and a second composite bent portion connected to the second composite corner portion; the first composite bent portion and the second composite bent portion are bonded and fixed to the annular portion through the adhesive layer.

9. The speaker according to claim 8, wherein the diaphragm main body comprises a first outer layer; the first outer layer is bonded and fixed to the composite layer through the adhesive layer; the composite layer is made of a same material as the first outer layer.

10. The speaker according to claim 9, wherein both the composite layer and the first outer layer are made of thermoplastic materials; the adhesive layer is also made of a thermoplastic material; a melting point of the thermoplastic material used in the adhesive layer is lower than a melting point of the thermoplastic material used in the composite layer and lower than a melting point of the thermoplastic material used in the first outer layer.

11. The speaker according to claim 8, wherein the composite bent portion further comprises a third composite bent portion connected to the third composite corner portion and a fourth composite bent portion connected to the fourth composite corner portion; the third composite bent portion and the fourth composite bent portion are bonded and fixed to the annular portion through the adhesive layer.

12. The speaker according to claim 11, wherein the fixing portion comprises a first side portion, a second side portion opposite to the first side portion, a third side portion, a fourth side portion opposite to the third side portion, a first corner portion connecting the first side portion and the third side portion, a second corner portion connecting the third side portion and the second side portion, a third corner portion connecting the second side portion and the fourth side portion, and a fourth corner portion connecting the fourth side portion and the first side portion;

the annular portion comprises a first bent portion connected to the first corner portion, a second bent portion connected to the second corner portion, a third bent portion connected to the third corner portion, and a fourth bent portion connected to the fourth corner portion; the first bent portion is fixed to the first composite bent portion; the second bent portion is fixed to the second composite bent portion; the third bent portion is fixed to the third composite bent portion; the fourth bent portion is fixed to the fourth composite bent portion;

each of the first bent portion, the second bent portion, the third bent portion and the fourth bent portion comprises a first corrugation; each of the first composite bent portion, the second composite bent portion, the third composite bent portion and the fourth composite bent portion comprises a second corrugation; the second corrugation is adapted to a corresponding first corrugation.

13. The speaker according to claim 8, wherein the composite bent portion comprises a fifth composite bent portion connected to the third composite side portion; the fifth composite bent portion connects the first composite bent portion and the second composite bent portion; the fifth composite bent portion is bonded and fixed to the annular portion through the adhesive layer.

14. The speaker according to claim 8, wherein the composite fixing portion comprises a first composite side portion, a second composite side portion opposite to the first composite side portion, a third composite side portion, a fourth composite side portion opposite to the third composite side portion, a first composite corner portion connecting the first composite side portion and the third composite side portion, a second composite corner portion connecting the third composite side portion and the second composite side portion, a third composite corner portion connecting the second composite side portion and the fourth composite side portion, and a fourth composite corner portion connecting the fourth composite side portion and the first composite side portion;

the composite bent portion comprises a sixth composite bent portion connected to the first composite side portion, a seventh composite bent portion connected to the second composite side portion, an eighth composite bent portion connected to the third composite side portion, and a ninth composite bent portion connected to the fourth composite side portion; the sixth composite bent portion, the seventh composite bent portion, the eighth composite bent portion and the ninth composite bent portion are bonded and fixed to the annular portion through the adhesive layer.

15. A speaker, comprising a speaker diaphragm;

the speaker diaphragm comprising:

a diaphragm main body comprising a fixing portion, an annular portion and a central portion; the annular portion being connected to the fixing portion; the central portion being connected to the annular portion;

a composite layer comprising a composite fixing portion and a composite bent portion connected to the composite fixing portion; and an adhesive layer, the composite fixing portion being fixed to the fixing portion through the adhesive layer; the composite bent portion being fixed to at least part of the annular portion through the adhesive layer;

wherein the speaker does not have a damper;

wherein the diaphragm main body comprises a first outer layer; the first outer layer is bonded and fixed to the composite layer through the adhesive layer; the composite layer is made of a same material as the first outer layer.

* * * * *